(12) United States Patent
Oberheim (10) Patent No.: US 7,231,858 B2
(45) Date of Patent: Jun. 19, 2007

(54) TABLE SAW HAVING A MEASUREMENT AND DISPLAY SYSTEM

(75) Inventor: Stephen C. Oberheim, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 10/823,270

(22) Filed: Apr. 13, 2004

(65) Prior Publication Data

US 2005/0223862 A1  Oct. 13, 2005

(51) Int. Cl.
 *B27B 27/02* (2006.01)
 *B26D 7/01* (2006.01)
 *G01B 7/04* (2006.01)

(52) U.S. Cl. ......................... 83/477.2; 83/438; 83/471; 83/522.18; 33/706

(58) Field of Classification Search ............... 83/76.9, 83/438, 477.2, 522.18, 522.19, 471; 700/193; 33/706–709, 640; 30/160–161, 342, 337, 30/338
See application file for complete search history.

(56) References Cited

U.S. PATENT DOCUMENTS

| | | | |
|---|---|---|---|
| 3,477,322 A * | 11/1969 | Heinz et al. ................. 83/76.5 |
| 3,808,577 A * | 4/1974 | Mathauser .................... 439/39 |
| 4,873,770 A | 10/1989 | Luttmer et al. | |
| 4,936,023 A * | 6/1990 | Pechak ......................... 33/706 |
| 4,961,269 A | 10/1990 | Luttmer et al. | |
| 4,982,509 A | 1/1991 | Luttmer et al. | |
| 5,063,685 A * | 11/1991 | Morrison et al. ............. 33/701 |
| 5,092,058 A | 3/1992 | Luttmer et al. | |
| 5,121,553 A | 6/1992 | Boerder | |
| 5,228,374 A | 7/1993 | Santeramo, Sr. | |
| 5,251,142 A | 10/1993 | Cramer | |
| 5,317,814 A | 6/1994 | Rogler | |
| 5,327,653 A | 7/1994 | Pistorius et al. | |
| 5,443,554 A | 8/1995 | Robert | |
| 5,444,635 A * | 8/1995 | Blaine et al. ................ 700/171 |
| 5,460,070 A * | 10/1995 | Buskness ....................... 83/438 |
| 5,524,514 A * | 6/1996 | Hadaway et al. ............ 83/76.9 |
| 5,735,324 A | 4/1998 | Ponce | |
| 5,845,410 A | 12/1998 | Boker | |
| 6,216,574 B1* | 4/2001 | Hain ............................ 83/241 |
| 6,263,584 B1 | 7/2001 | Owens | |
| 6,480,757 B1* | 11/2002 | Susnjara ...................... 700/159 |
| 6,644,157 B2* | 11/2003 | Huang ......................... 83/438 |
| 6,899,006 B2* | 5/2005 | Jolkovski .................. 83/522.18 |
| 2001/0000856 A1 | 5/2001 | O'Banion | |
| 2002/0157515 A1* | 10/2002 | Dick ............................. 83/438 |
| 2004/0060411 A1 | 4/2004 | Svetlik | |

* cited by examiner

*Primary Examiner*—Boyer D. Ashley
*Assistant Examiner*—Laura M. Lee
(74) *Attorney, Agent, or Firm*—Greer, Burns & Crain, Ltd (57) ABSTRACT

A table saw having various embodiments of a measurement and display system. Several embodiments have at least one fence rail on which a removable fence is movably supported and comprise an elongated sensor strip that is located adjacent the fence rail and a sensing unit that is supported and positioned adjacent to the sensor strip and is capable of providing an electrical signal to a display unit that is indicative of the position of the sensor unit relative to the elongated sensor strip. A processing unit is operatively connected to the sensing unit and display unit to provide a digital readout of the position of the sensing unit. A switch is connected to the processing unit and is adapted to provide a zero or reference setting position.

18 Claims, 13 Drawing Sheets

TABLE SAW HAVING A MEASUREMENT AND DISPLAY SYSTEM

BACKGROUND OF THE INVENTION

Table saws of the type which have a circular cutting blade are well known and have been used by tradesmen and woodworkers for decades. Because they have a generally flat surface, large and small boards as well as plywood sheets can be cut to the appropriate size by typically setting a fence at the appropriate position to perform a cut along a desired line which is done by pushing the board or sheet across the tabletop and through the blade. Typically, the fence is adjustable by sliding along an elongated rail anchored at opposite ends of the table saw top, with the fence having a clamping mechanism to lock the fence once it has been placed in the desired position. Most users, when they know the width of the desired board will use a tape measure or other measure to position the fence to obtain the desired width by measuring between the edge of the blade to the fence. After the fence is in position, it is locked in place and users typically remeasure the distance to make sure that they have the fence in the correct position.

While the manual measurement and setting of the position of the fence is the manner in which the fence has been positioned by most users over the years, in some instances it is highly desirable to have very accurate measurements which may be difficult depending upon the type of measuring device is being used. Most tape measures, for example, do not have accurate measurements beyond a 1/32 of an inch or less. Also, if the fence is moved during other types of cuts, it is not possible to reset the fence at exactly the same position that was used for a prior cut without going through the complete exercise again. If the user does not remember the prior cut distance, then additional measurements of a work-piece may be necessary in order to obtain the distance which must then be used to correctly position the fence.

SUMMARY OF THE INVENTION

A table saw having a measurement and display system has at least one fence rail on which a removable fence is movably supported. Several embodiments have an elongated sensor strip located adjacent the fence rail and a sensing unit that is supported and positioned adjacent to the sensor strip and is capable of providing an electrical signal to a display unit that is indicative of the position of the sensor unit relative to the elongated sensor strip. A processing unit is operatively connected to the sensing unit and display unit to provide a digital readout of the position of the sensing unit. A switch is connected to the processing unit and is adapted to provide a zero or reference setting position and this embodiment may include a second switch for changing between English and metric units.

A second preferred embodiment includes a table extension which can be moved to increase the effective size of the table saw top so that larger work pieces can be supported during cutting. In this embodiment, the fence rail is connected to an extension rail so that the fence rail moves with the extension to thereby increase the range of the sensor strip and sensing unit for providing larger measurements.

A third preferred embodiment includes a more sophisticated display and processor functionality, which, among other things, can display English units in decimal or fractions as well as store and recall important distance measurement positions.

A fourth preferred embodiment includes a mounting mechanism that enables a relatively short and inexpensive sensor strip to be selectively positioned to increase the range of measurement of a fence along the width of the table saw and to adjust the measurement as a result of the position of the sensor strip.

A fifth preferred embodiment operates with a sensing rail that is located on the front of the table saw, but has all other operative elements mounted on the fence.

Sixth and seventh preferred embodiments operate with a string or tape position transducer device that interconnects a stationary location on the table saw and the movable fence.

DETAILED DESCRIPTION OF THE PREFERRED EMBODIMENTS

Figure 1:
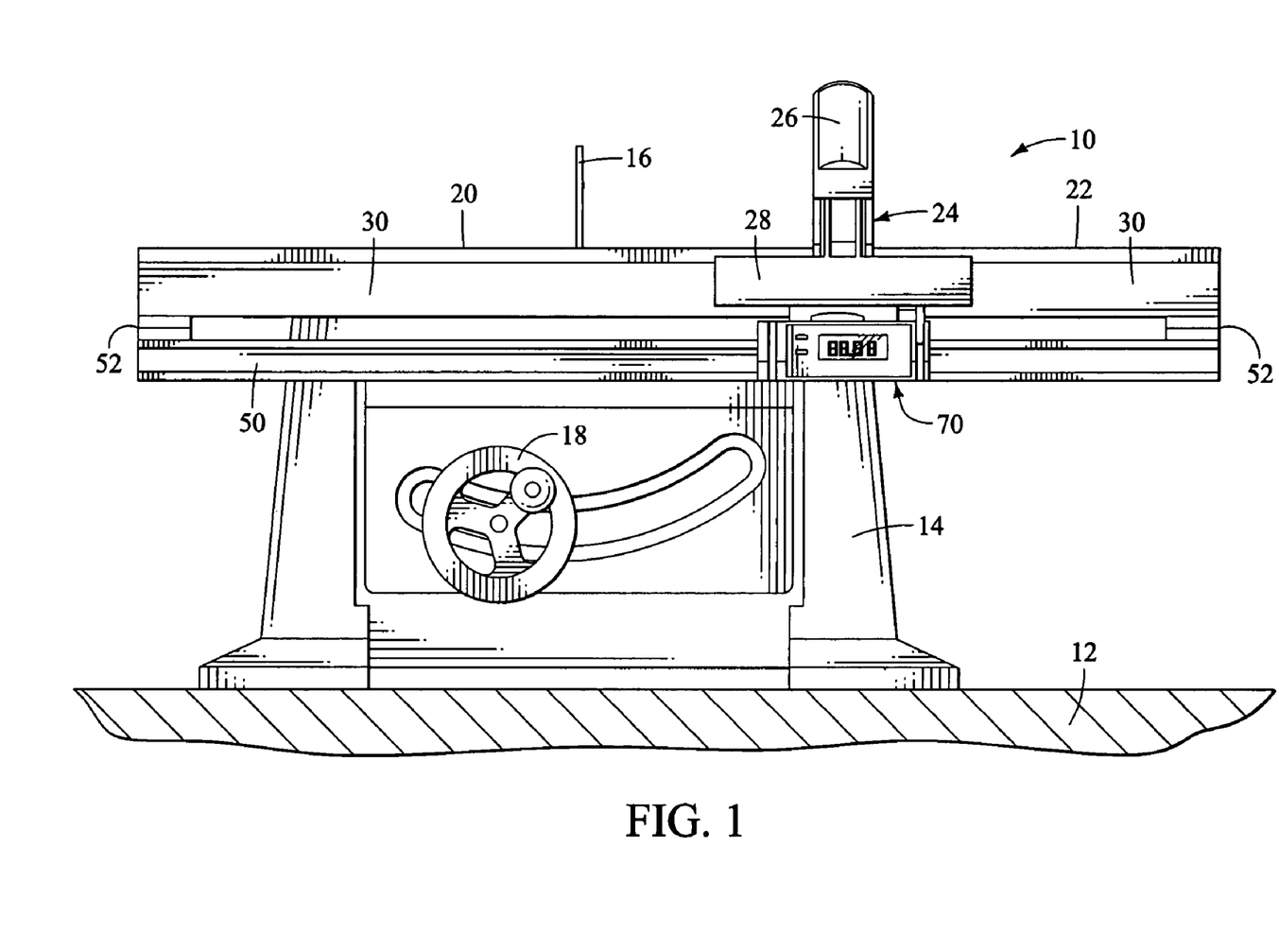
FIG. 1 is a front view of a first preferred embodiment of a table saw having a measurement and display system.
Figure 2:
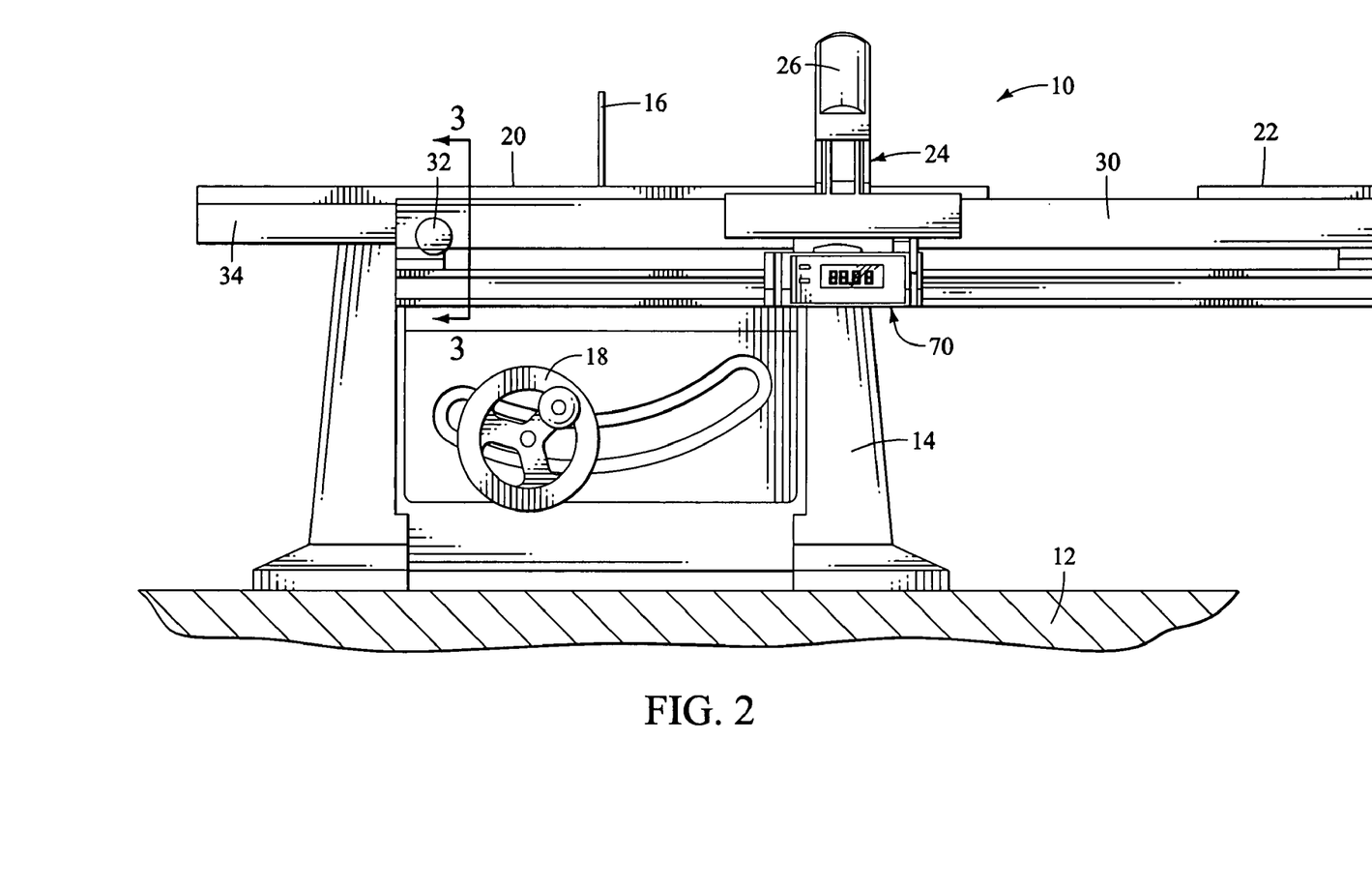
FIG. 2 is a front view of a second preferred embodiment of a table saw similar to the table saw shown in FIG. 1, but having a tabletop extension shown in an extended position.
Figure 3:
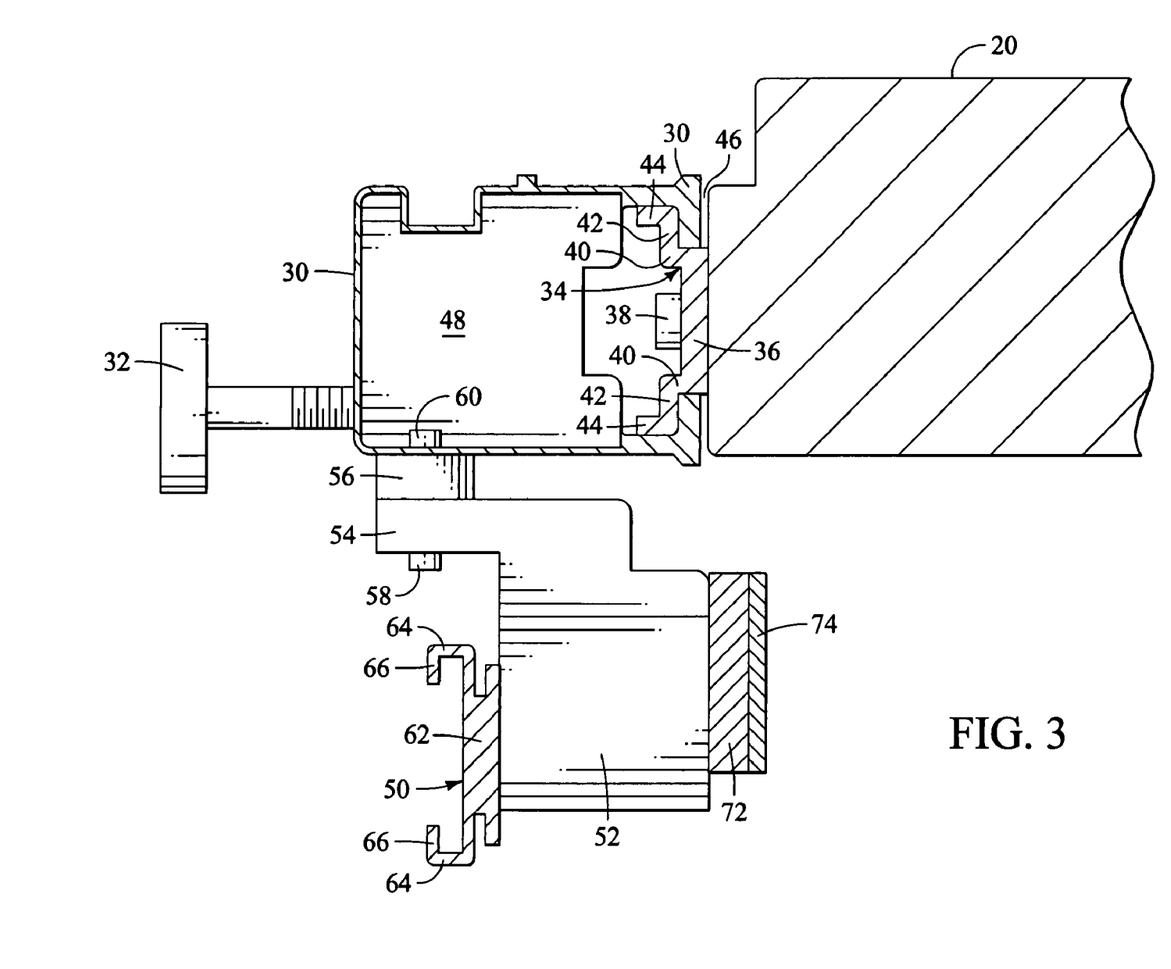
FIG. 3 is a cross-section taken generally along the line 3-3 of FIG. 2.

A first embodiment of a table saw of the present invention is shown in FIGS. 1, 2 and 3 and illustrates a table saw, indicated generally at 10, of the type which is configured to be supported by a table 12 or other support structure or frame having legs. It should be understood that the table saw 10 could be of the type which has its own support stand and may be more permanent rather than the one illustrated which is often referred to as a portable saw. The saw 10 has a base 14 in which the saw motor (not shown) is located with the motor driving a blade 16, the height of which can be adjusted by conventional adjustment means (not shown) and which can also be angularly adjustable by an assembly that includes a wheel 18.

The saw 10 has a main tabletop 20, a tabletop extension 22 and an adjustable fence, indicated generally at 24, that has a handle 26 that can be raised and lowered to lock the fence in a desired lateral position relative to the blade. The fence has a base portion 28 that is slidably adjustable along a fence rail 30 that extends substantially the full width of the saw. While not illustrated, the fence preferably has its opposite end configured to ride on another fence rail which facilitate its sliding lateral movement, i.e., left and right as shown in FIG. 1.

The table saw 10 illustrated in FIG. 1 is shown with the extension 22 in an unextended position whereas in FIG. 2, the extension 22 is extended outwardly to the right. This is achieved by a locking knob 32 being loosened so that the fence rail 30, which is supported by an extension rail 34 can be moved along the extension rail 34. It should be understood that the fence 24 in FIG. 2 has been moved relative to its position in FIG. 1 to more clearly illustrate the manner in which the extension 22 moves relative to the extension rail 34. The configuration which particularly illustrates the interoperability of the fence rail 30 and the extension rail 34 is shown in FIG. 3, with the extension rail 34 having a base portion 36 that is connected to the main top 20 by bolts 38, screws, weldments or the like, with short transverse segment 40 extending away from the base 36 and then outwardly to form flanges 42 and transverse end segments 44. The configuration provides a narrow space 46 between the top 20 and the extension rail 34 so that the fence rail 30 can easily slide relative to the extension rail 34 but be held captive so that any appreciable vertical and horizontal movement between the two components is prevented. An end cap 48 made of plastic or plastic-like material is preferably provided at opposite ends of the fence rail 30 and is preferably a resilient material that can be snap-fit into the interior of the rail 30.

As best shown in FIGS. 1, 2 and 3, a display rail 50 is positioned below the fence rail 30 and is attached thereto by two brackets 52 which are located at opposite ends of the fence rail 30. The brackets 52 have a front upper flange 54 upon which a spacer 56 is positioned with the flange 54 and spacer being connected to the fence rail 30 by a bolt 58 and nut 60, screws, weldment or other equivalent attachment means. The opposite ends of the display rail 50 are attached to the bracket 52 by suitable screws, adhesive, bolts or the like (not shown). The display rail has a base portion 62 as well as transverse end portions 64 and return flanges 66 which define a recess in which a display unit, indicated generally at 70, can be inserted and be held captive so that vertical and horizontal movement is prevented but which will permit sliding lateral movement, i.e., left or right as shown in FIGS. 1 and 2.

On the backside of the bracket 52 a sensor strip 72 is attached by screws, bolts, adhesive or the like. A sensor strip 74 is attached to the sensor strip 72, preferably using an adhesive material. While the cross section of the sensor strip 74 is shown in FIG. 3 and is therefore illustrated to be located at the left end of the sensor strip 72. In actuality, the length of the sensor strip 74 is preferably within the range of about 15 to about 25 inches and preferably about 20 inches with the left end of the sensor strip being approximately coextensive with the blade and extending to the right end thereof as shown in FIG. 1. In this regard, the drawing is technically in error, but does generally show the relative size and configuration of the strip relative to the sensor strip. It should also be understood that when the extension 22 is moved to the right as shown in FIG. 2, the left end of the sensor strip 74 will move to the right of the blade 16.

It should be understood that another preferred embodiment of the table saw may not include the extension 22 and therefore would not need to have the extension rail 34, in which case the fence rail 30 would be attached directly to the table top 20 or other structure associated with the frame because the fence rail 30 would not move laterally.

Figure 4:
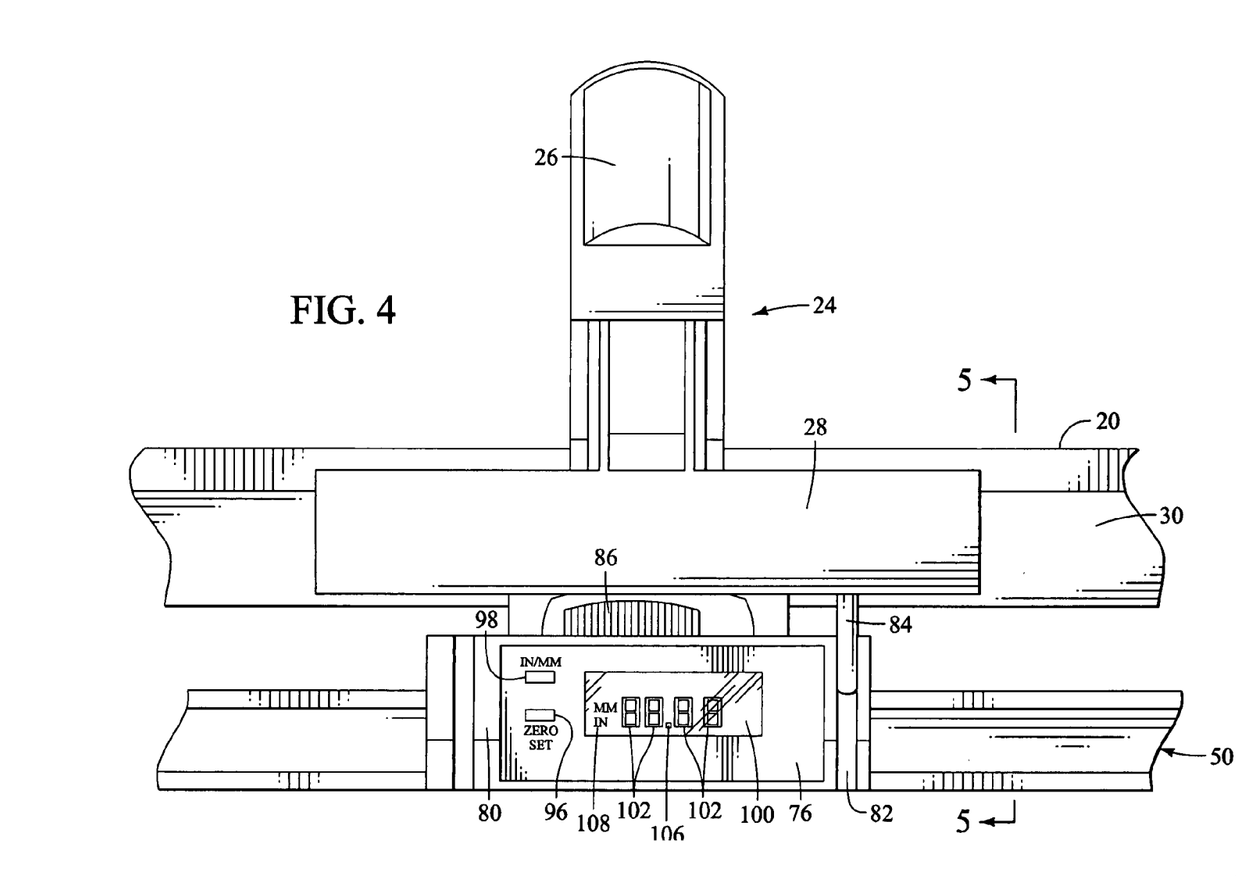
FIG. 4 is a front view of a portion of the table saw shown in FIGS. 1 and 2.

As shown in FIG. 4, the display unit 70 has an electronic display 76 that is mounted to a display block 78 that is preferably a unitary piece of aluminum or other metal that has an angled front face 80 with a suitable recess (not shown) in which the display 76 can be inserted, with the ends extending further outwardly so as to provide some protection against damage during use. The right end of the block 78 has a vertically oriented slot 82 that has a width that is closely matched to the outside diameter of a pin 84 that is attached to the fence base 28. The pin 84 therefore causes the display unit 70 to move with the fence as it is laterally adjusted during use. Since the pin 84 merely rides in the slot 82 of the block 78, the fence 24 can be lifted without difficulty from the table saw. However, when it is lowered into place so that the fence base 28 rides on the fence rail 30, the pin 84 is closely fits in the slot 82. The display 76 has a ribbon connector 86 that extends to a sensor 88 that is secured to the display block 78 by a bolt 90, although adhesive or other attachment means may be used. The sensor 88 is configured relative to the sensor strip 72 so that the necessary tolerances between the two are maintained as the sensor 88 is moved along the sensor strip.

A sensor 88 is secured to the display block 78 by bolts 90 and the sensor strip 72 has copper pads along its length that are positioned to provide a changing capacitance that is sensed by the sensor element 58 and which can thereby provide accurate measurement of incremental positions along the length of the rail. In this regard, it is preferred that the sensor strip 72 and sensor 88 be similar to those that are presently used in commercially available digital calipers. Other linear sensor technologies based on inductance, magnetostrictive effects or resistive elements can also be used.

The display 76 has a front panel with a pushbutton switch 96 which is a zero set switch and a switch 98 which toggles between English and metric systems in the display window 100. The display window is preferably a LCD display which has four integers 102 and a decimal 106 as well as a field 108 indicating inches or millimeters.

During operation, when the fence 24 is positioned abutting the blade 16, for example, an operator can depress the zero set pushbutton 96 which will result in the display window readout indicating a zero position. That having been done, if the user wants to position the fence so that a six inch wide cut of a work piece is desired, the fence 24 can be moved to the right until the display indicates that the fence has been moved 6.00 inches (or the appropriate millimeter conversion) at which time the user can lock the fence 24 in position by moving the lock handle 26 downwardly in the illustrated embodiment.

If during the locking of the fence, the fence moves either left or right as shown in FIG. 4, the display 76 will so indicate, which enables the user to unlock the fence and correctly position it until the exact distance of six inches is locked into position. If the sensing strip/sensor has a $\frac{1}{100}$ inch or $\frac{1}{10}$ millimeter degree of accuracy, the fence can be positioned to that degree of accuracy.

Figure 6:
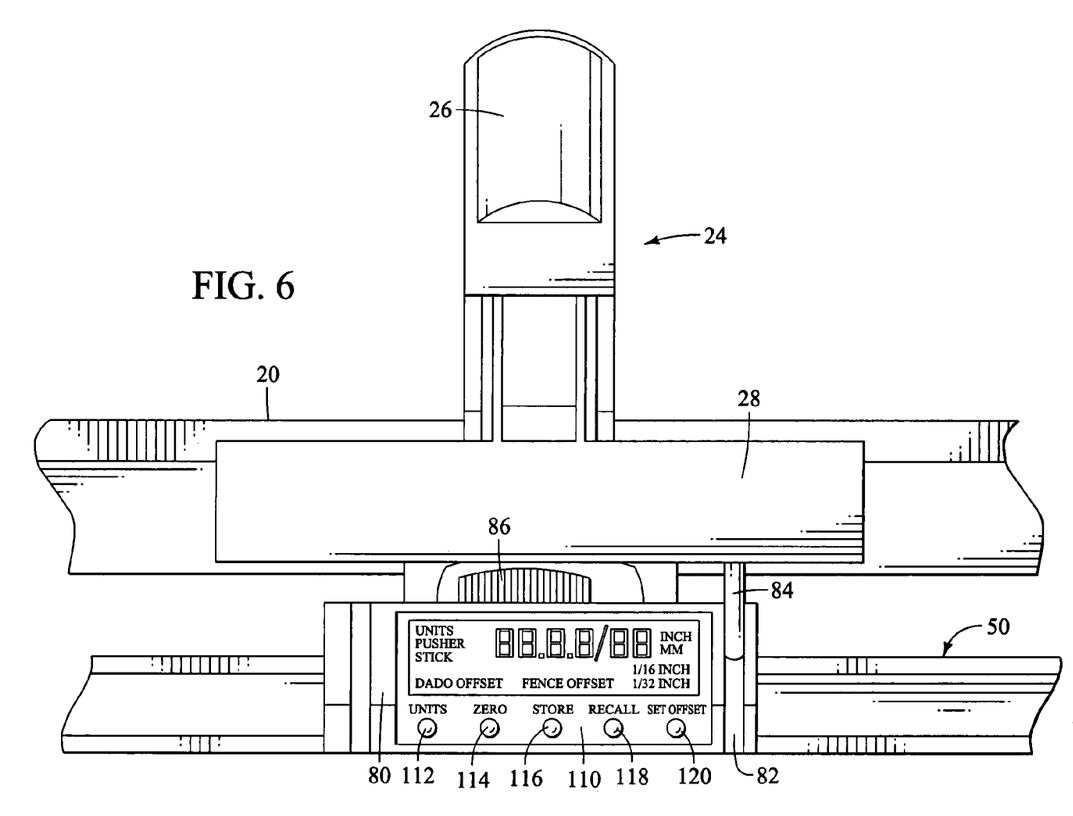
FIG. 6 is a front view of a third preferred embodiment illustrating a display unit having additional functionality relative to the display unit shown in FIG. 4.

Turning to another preferred embodiment of the present invention and referring to FIG. 6, a display 110 is shown which has additional functionality. More particularly, the display has a pushbutton 112 which toggles between English and metric units and has a six integer display with two decimal points and a slash indicator which enables English units to be displayed in hundredths or in fractions and metric units to be displayed in thousandths or ten thousandths of an inch. Additionally, the display includes a zero pushbutton 114 as well as a store pushbutton 116 and a recall pushbutton 118 as well as an offset pushbutton 120. The display is also operable to set and utilize a DADO blade offset as well as a fence offset in either 1/16 or 1/32 increments which enables a user to appropriately set the position.

Figure 7:
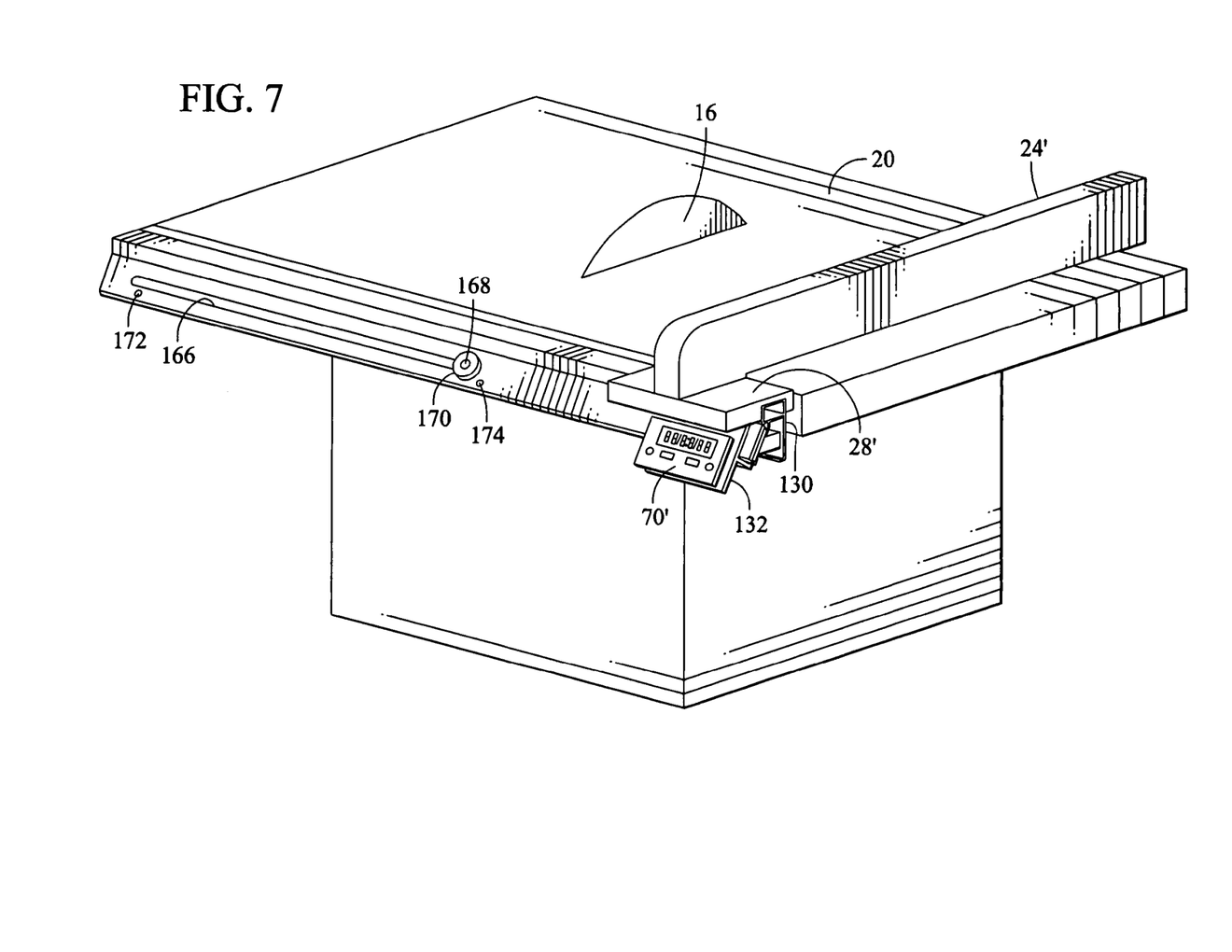
FIG. 7 is a perspective view of an idealized illustration of a third preferred embodiment of a table saw having a measurement and display system.
Figure 8:
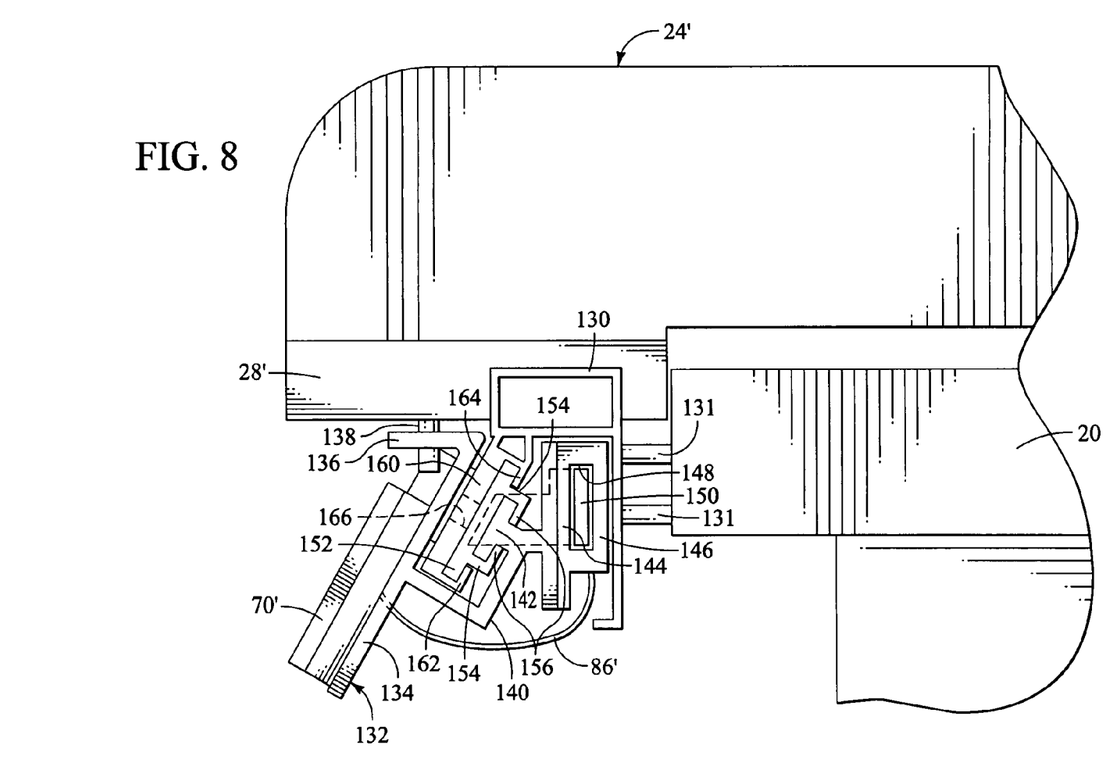
FIG. 8 is an end view of the embodiment shown in FIG. 7 and illustrating a mounting bracket in phantom.
Figure 9:
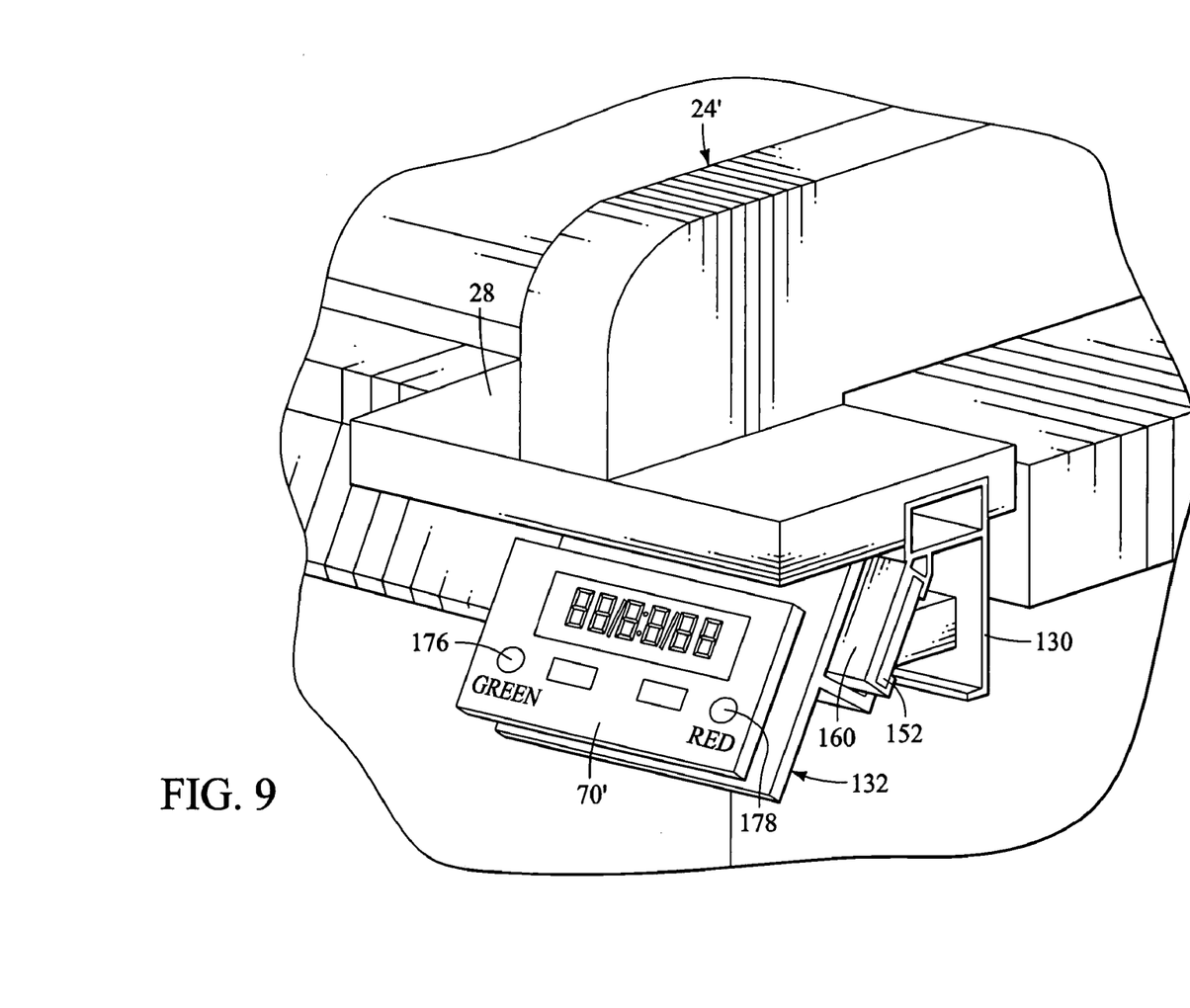
FIG. 9 is an enlarged perspective of a portion of the embodiment shown in FIG. 7.

Another embodiment of the present invention is shown in FIGS. 7-9 which comprises a table saw having a table top 20 that has an opening through which a saw blade 16 is positioned. A fence indicated generally at 24' has a base 28' that has a recess which cooperatively engages a fence rail 130 and is configured to slide along the fence rail 130 and be clamped to it. While the diagrammatic illustration of the fence 24 shown in FIGS. 7, 8 and 9 is greatly simplified, it should be understood that a clamping or locking mechanism is preferably provided as is known to those of ordinary skill in the art.

The fence rail 130 is attached to the table 20 by suitable bolts or the like that are located inside a pair of standoffs 131 which appropriately space the fence rail from the front edge of the tabletop 20. A display 70' is mounted on a block extrusion 132 that is coupled to the base 28' of the fence 24'. The block extrusion 132 has an angled front portion 134 to which the display 70' is attached and the top of the front portion 134 has a forwardly directed flange 136 that is substantially parallel to the base 28' of the fence. A pin 138 mounted to the base 28' extends into a slot in the flange 136 with the width of the slot being substantially equal to the outside diameter of the pin 138 so that movement of the fence along the sensing rail 130 will also move the block extrusion 132.

Figure 5:
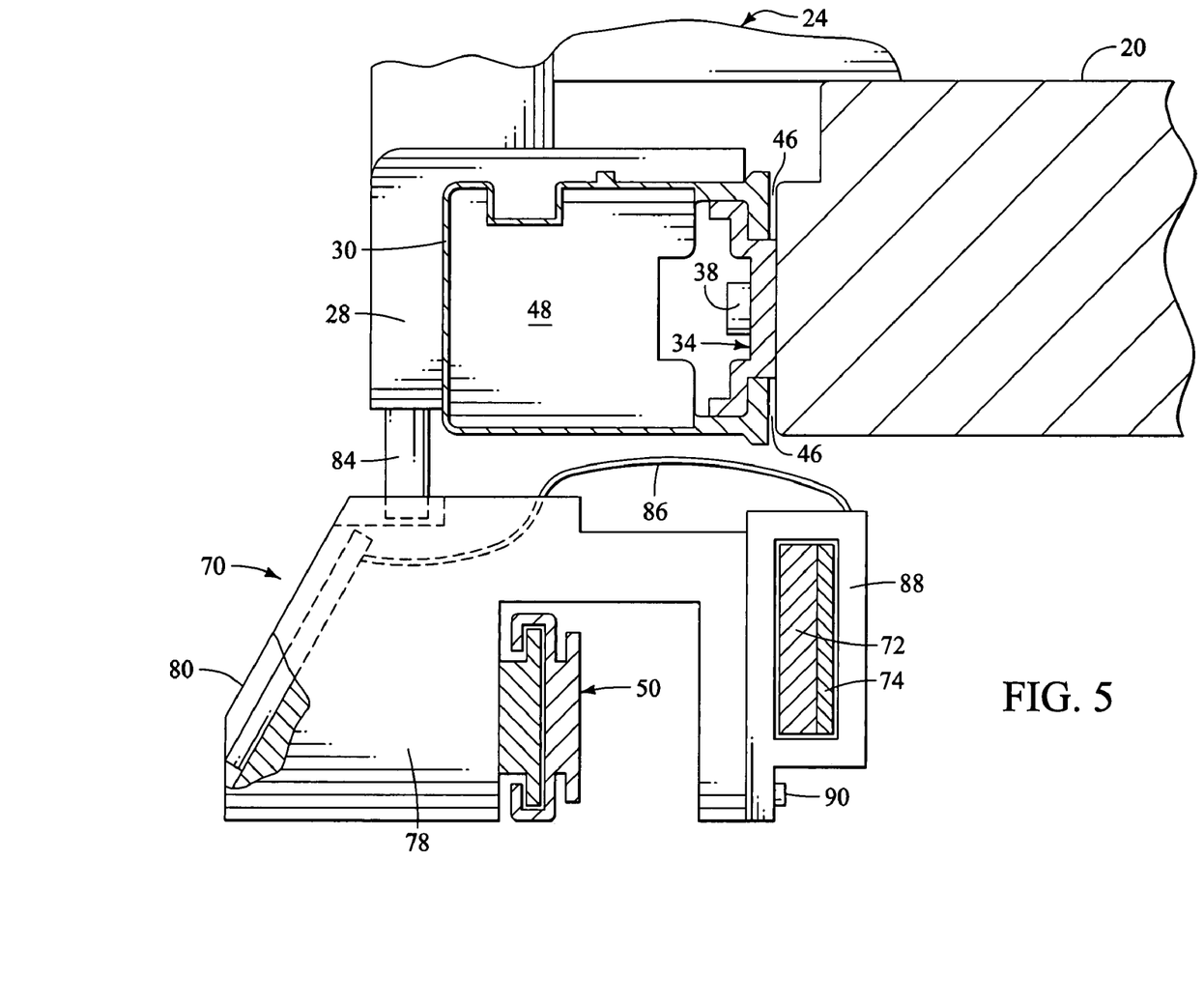
FIG. 5 is a section taken generally along the line 5-5 of FIG. 4.

The block extrusion 132 also has a middle portion 140 that extends in the rearward direction and carries a T-shaped cross section 142 as well as a rearward extension 144 that is vertically oriented and provides a surface to which a sensing unit 146 is mounted. A flexible ribbon cable similar to the ribbon connector 86 shown in FIG. 5 interconnects the sensing unit 146 to the display module 70'.

The sensing unit has an opening 148 through which a sensing rail 150 is positioned, the sensing rail being mounted at opposite ends to an extension rail 152. The extension rail 152 has a pair of rearward extensions 154 which have transverse extensions 156 that are directed toward each other and encompass the T-shape portion 142 of the block extrusion. The block extrusion 132 is supported by and can move relative to the extension rail 152 enabling the sensing unit 146 to provide a measurement of the position along the sensing rail 150 and provide a digital output of the position. Importantly, the length of the extension rail 152 is slightly greater than the length of the sensing rail 150 and a pair of brackets at each end attach the extension rail 152 to the sensing rail 150. The extension rail is itself supported and held captive in the fence rail 130 which has an inclined inside front portion 160 that has a lower angled flange 162 and an upper flange 164 which surround the extension rail 152. The extension rail 152 is movable relative to the fence rail 130 by a distance that is approximately equal to the length of the slot 166.

As is best shown in FIG. 7, the fence rail 130 has an elongated slot 166 through which a threaded bolt 168 is located, with the bolt having a knob 170 that can be rotated to tighten or loosen the bolt 168 which is threaded into an opening in the extension rail 152. When it is loosened, the extension rail may be moved so that the knob will be moved along the length of the slot 166 which is approximately 12 inches in the illustrated embodiment. This means that the length of the sensing rail 150 is approximately the same length, with the width of the tabletop 20 being approximately two feet in total. However, it should be understood that a shorter or longer slot may be provided.

When the knob 170 is loosened, the extension rail 152 can be moved along the slot 166 from the position that is shown to the far left end as shown in FIG. 7. Indicia such as a green dot 176 near the left end and a red dot 178 on the right end are provided together with green and red switches 176 and 178, respectively, which the operator can press depending upon which end the knob 170 is positioned. By so doing, the processing means in the display module 70' can automatically compensate for the changed position relative to the blade 16. In this way, a 12 inch long sensing rail can be used to effectively measure across the entire width of the table. This is advantageous because the cost of sensing systems and particularly sensing rails dramatically increases with increased lengths.

Figure 10:
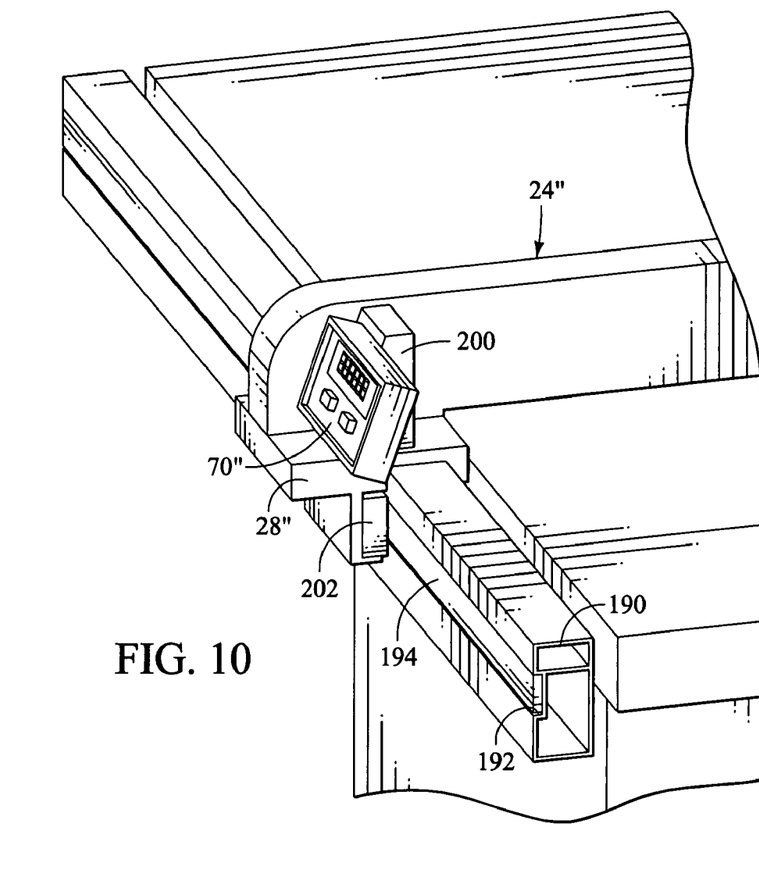
FIG. 10 is a perspective view of an idealized illustration of a fourth preferred embodiment of a table saw having a measurement and display system.
Figure 11:
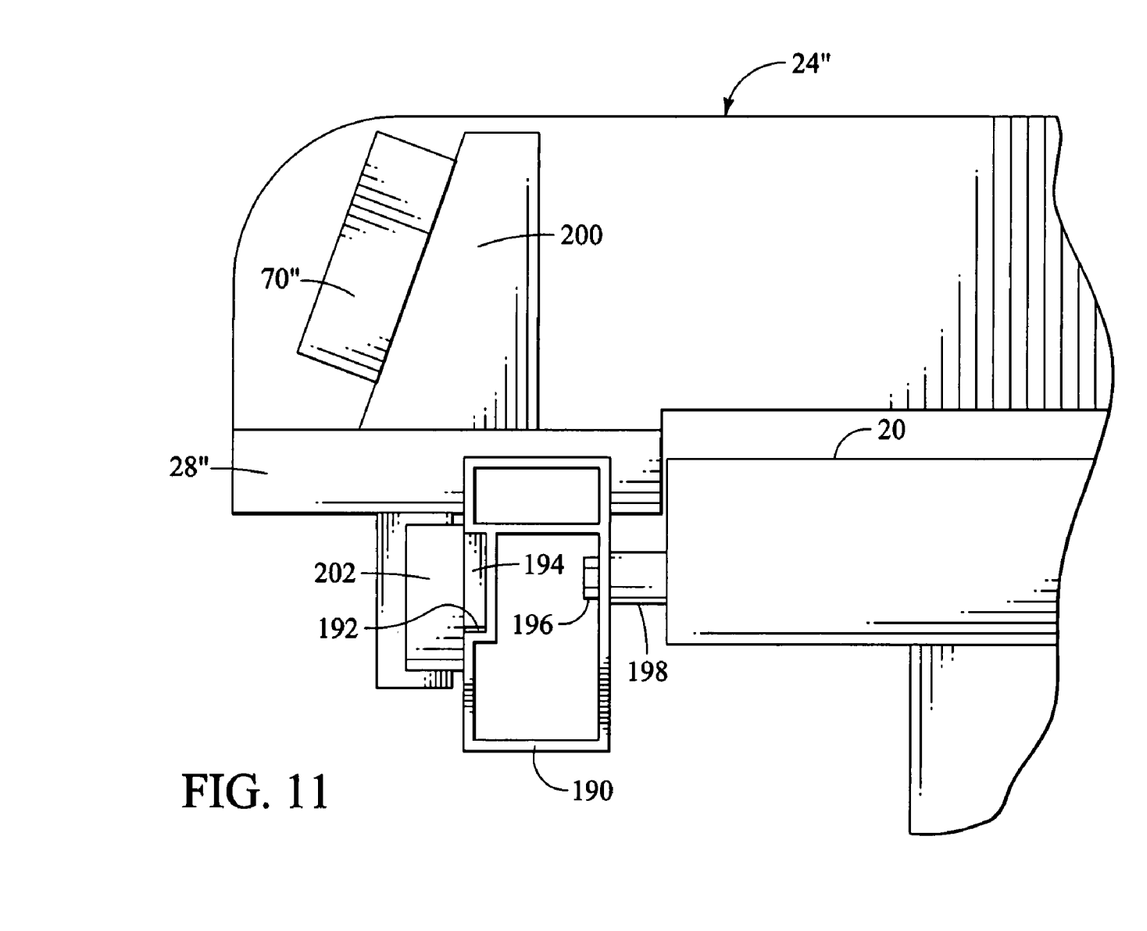
FIG. 11 is a perspective view of an idealized illustration of a fifth preferred embodiment of a table saw having a measurement and display system.

A fifth preferred embodiment is shown in a simplified diagrammatic fashion in FIGS. 10 and 11, and has a removable fence 24" with a base 28" that is configured to be supported on a fence rail 190 that is preferably an extrusion with a flat top and a front recess 192 which is configured to receive a sensing rail 194 that is attached to the rail by suitable means such as an adhesive, mechanical clips, screws, or the like. The fence rail 190 is attached to the saw table top 20 by two or more bolts 196 which extend from the fence rail 190 to the top 20 through standoffs 198 as shown in FIG. 11.

As is shown in FIG. 10, the sensing rail 194 extends substantially across the entire front of the table saw. The fence 24" has a mounting bracket 200 attached thereto for providing a support for a display module 70" that may have structure and functionality that is similar to the structure of the display module 70 or 76. A sensor unit 202 is mounted to the bottom 28" of the fence 24" and is positioned adjacent the sensor strip 194. An advantage of this embodiment is that all components except the sensor strip 194 are mounted to the fence 24", and no wires between the sensor unit 202 and the display module 70" need to be exposed and therefore susceptible to damage during use. The fence can be easily removed from the table saw without the necessity of disengaging any parts, unplugging cables or other inconveniences.

Figure 12:
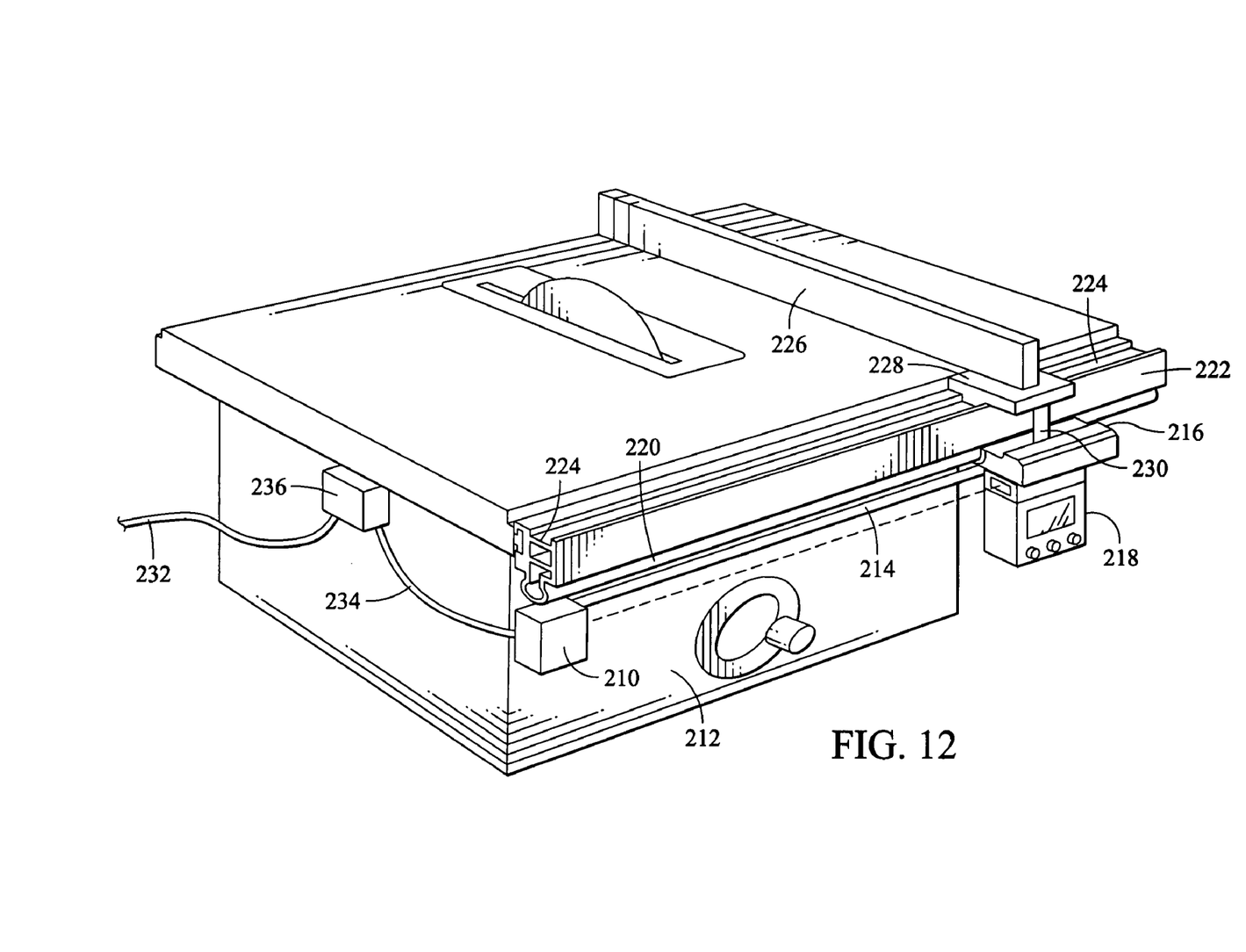
FIG. 12 is a perspective view of an idealized illustration of a sixth preferred embodiment of a table saw having a measurement and display system.

A sixth preferred embodiment is shown in FIG. 12 and has a rotational position transducer unit 210 that is mounted to the table saw 212 and has a flexible tape 214 extending from the unit that extends to and is connected to a bracket 216 to which a display module 218 is attached. While a tape 214 is shown, it should be appreciated that a cable or string type of unit is commercially available and may be used. Regardless, the tape 214 is held under tension by a spring mechanism in the position transducer unit 210 and the unit generates an electrical signal that is indicative of the amount of tape or string that is pulled out of the unit 210. The bracket 216 is supported by and slides along a bottom portion 220 of an extrusion 222 that extends along the front of the saw 212. The extrusion has a recess 224 in which a fence 226 can slide with fence having a base portion 228 that has a downwardly extending pin 230 that can fit within a hole in the bracket. 216. This enables the fence 226 to be removably coupled to the bracket 216. While not shown, the fence preferably has a locking mechanism to hold the fence in the desired position when that is determined. Power for operating the unit 210 can be provided by an AC source through cords 232, 234 and transformer 236. Alternatively, a battery may be used if desired.

The tape 214 can be attached to either the bracket 216 or the display unit 218 as desired. As the fence and bracket 216 are moved along the front of the table saw 212, the tape 214 is wound and unwound from the unit and an electrical signal is generated and is communicated to the display unit 218. In this embodiment, the communication is preferably accomplished by an infrared transmitter in the unit 210 and an infrared receiver in or adjacent to the display unit 218. Other types of communication can be used as desired. Also in this embodiment, a zero button is used to calibrate the position of the fence at a zero position relative to the blade as has been previously described with regard to other embodiments, enabling the distance from the fence 226 to the blade of the saw to be displayed as the fence 226 is moved away from the blade the desired distance. An advantage of this embodiment is that the incremental cost for increased distances is significantly lower than for many other types of sensing strips or rails.

Figure 13:
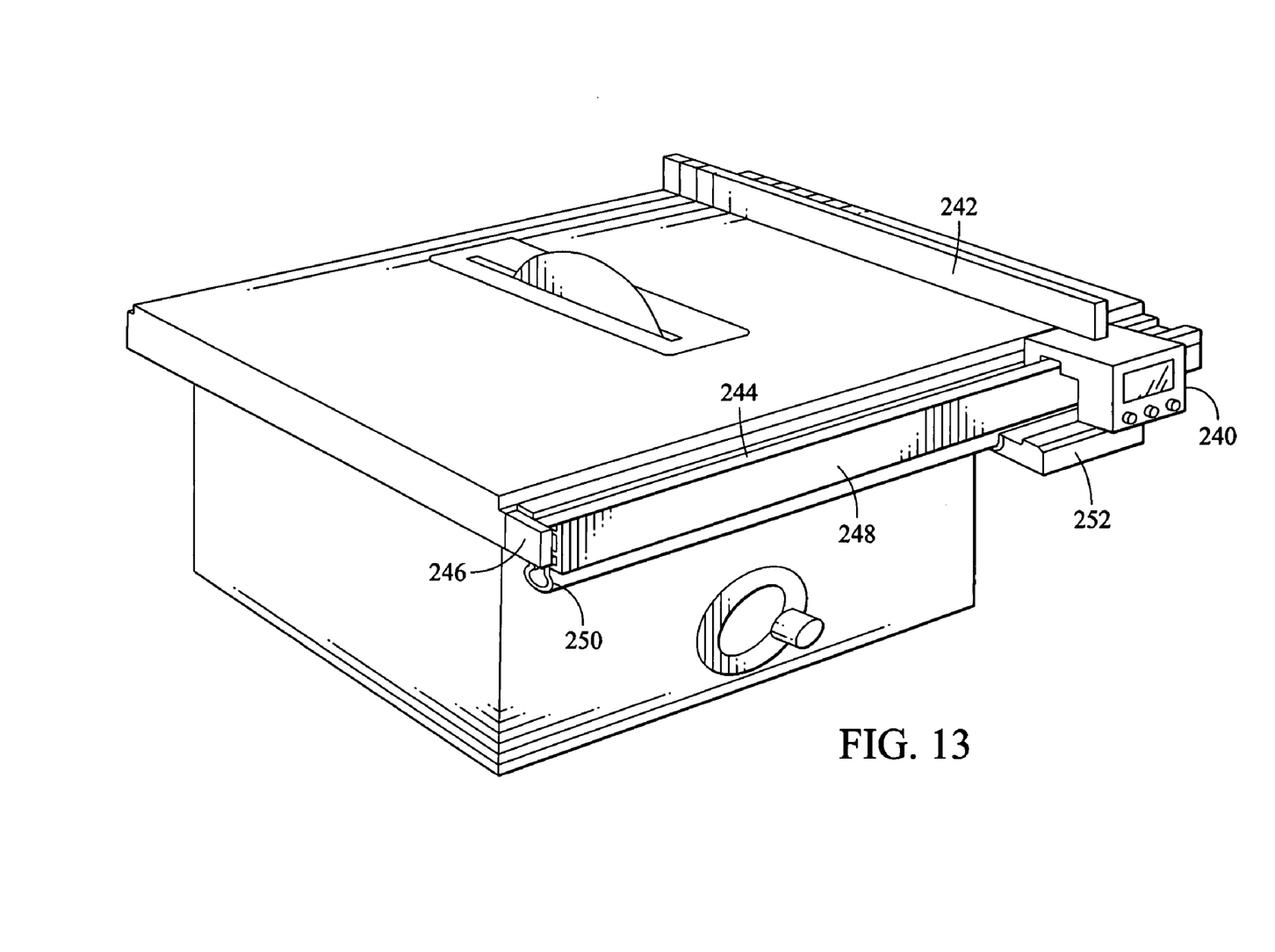
FIG. 13 is a perspective view of an idealized illustration of a seventh preferred embodiment of a table saw having a measurement and display system.

A seventh embodiment is shown in FIG. 13 and is similar to the embodiment of FIG. 12, except that a rotational position transducer unit is located within a display unit module 240 has a fence 242 mounted to it. While not shown, the fence 242 is preferably removable from the module 240 and a locking mechanism is either associated with the fence 242 or the module 240. A tape 244 extends from the module 240 and is attached to a bracket 246 or the like that is attached to the table saw. This embodiment has an extrusion 248 that is similar to the extrusion 222 of FIG. 12 in that it has a lower portion 250 on which a bracket 252 is slidably attached. The bracket 252 is attached to and carries the display module 240. The operation of this embodiment is substantially similar to the embodiment shown in FIG. 12, but has the advantage that the position transducer unit is directly connected to the display unit and no independent communication capability is required.

With regard to all of the embodiments described above, the sensing unit and sensor strip may have copper pads along its length that are positioned to provide a changing capacitance that is sensed by the sensor unit and which can thereby provide accurate measurement of incremental positions along the length of the rail. In this regard, it is preferred that the sensor strip and sensor element be similar to those that are presently used in commercially available digital calipers. However, other linear sensor technologies based on inductance, magnetostrictive effects, resistive elements or optical encoded techniques can also be used without departing from the spirit and scope of the invention.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A table saw having a measurement and display system, comprising:
    a frame structure having a main table top, a front, a back and two sides;
    a circular saw rotatable around an axis, mounted in said frame structure and extendable through an opening in said table top, said saw being vertically and angularly adjustable in said frame structure;
    a motor supported by said frame structure operatively connected to drive said circular saw;
    an elongated fence rail positioned adjacent said front of said frame structure;
    a fence releasibly attached to said fence rail and extending over said table top;
    a sensor strip connected to said fence rail, said rail having said sensor strip configured to provide digital signals that are indicative of specific positions along the length thereof;
    a sensing unit movable along said sensor strip and operatively connected to said fence, said sensing unit generating signals indicative of the specific longitudinal position of said fence;
    a switch operatively connected to a processing unit for establishing a reference position when activated;
    a processing unit connected to said sensing unit for receiving said position indicating signals and for calculating the distance between said fence and said reference position and for generating display signals indicative of said calculated distance;
    a display unit electrically connected to said processing unit configured to receive said display signals and provide a digital display of said calculated distance; and
    a member physically connecting said sensing unit, said display unit and said processing unit together, said fence having a fixed elongated protrusion configured to engage a recess in said member when said fence is lowered onto said fence rail, whereby said fence cannot be moved relative to said member in the longitudinal direction of said fence rail, said protrusion separating from said recess when said fence is lifted from said fence rail.

2. A table saw as defined in claim 1 wherein said processing unit is capable of generating display signals that cause said display unit to display said calculated distance in one of English or metric units.

3. A table saw as defined in claim 1 wherein said processing unit is housed with said sensing unit, said table saw further comprising a battery for powering said processing unit and said sensing unit.

4. A table saw as defined in claim 1 further comprising a display rail oriented parallel to said sensor strip, said display unit being slidable along said display rail and being mechanically and electrically connected to said sensing unit and said processing unit.

5. A table saw as defined in claim 1 further comprising a table top extension that abuts said main table top and at least one table extension rail, said table top extension being connected to said fence rail, said fence rail being slidably attached to said table extension rail so that said table top extension can be separated from said main table top to increase the effective area of the top of said table saw.

6. A table saw as defined in claim 4 wherein at least one ribbon connector electrically connects said sensing unit with said display unit and said processing unit.

7. A table saw as defined in claim 1 further comprising a block that is slidable on said display rail, said processing unit and display unit being mounted on said block and said block being connected to said sensing unit.

8. A table saw as defined in claim 7 further comprising a bridge member that connects said sensing unit to said block.

9. A table saw as defined in claim 7 wherein said block has a cross section defining a front portion for mounting said display unit, a middle portion with a configuration that cooperatively engages and is supported by said extension rail and is movable along said extension rail, and a rear portion for mounting said sensing unit in cooperative operating position of said sensing rail.

10. A table saw as defined in claim 9 wherein said middle portion has a generally T-shaped configuration and said extension rail has a configuration that substantially surrounds said T-shaped middle portion.

11. A table saw as defined in claim 10 wherein said fence rail has an elongated slot extending a predetermined distance on one side of said table saw, said extension rail having a locking means releasably attached thereto, said locking means extending through said slot, said extension rail being movable relative to said fence rail by said predetermined distance.

12. A table saw as defined in claim 11 wherein the length of said sensor strip is generally said predetermined length, said sensor strip has opposite end portions mounted to said extension rail so that said sensor strip can be moved between left and right positions such that said sensing unit can measure its position substantially across the entire width of said table saw.

13. A table saw as defined in claim 12 further comprising switch means for generating input signals for designating either the left or right position of said extension rail relative to said fence rail, said processing unit selectively receiving said input signals and adjusting said measured distance by said predetermined distance.

14. A table saw as defined in claim 7 wherein said switch is mounted adjacent said display unit.

15. A table saw as defined in claim 14 further comprising a switch for selectively alternating between English and metric units of length.

16. A table saw as defined in claim 7 wherein said fence has a pin that extends toward said block and is configured to engage a slot in a manner that relative movement in the direction of measurement is prohibited.

17. A table saw as defined in claim 1 wherein said sensing unit, processing unit, said switch and said display unit are attached to said fence.

18. A table saw having a measurement and display system, comprising:
 a frame structure having a main table top, a front, a back and two sides;
 a circular saw rotatable around an axis, mounted in said frame structure and extendable through an opening in said table top, said saw being vertically and angularly adjustable in said frame structure;
 a motor supported by said frame structure operatively connected to drive said circular saw;
 an elongated fence rail positioned adjacent said front of said frame structure;
 a fence releasibly attached to said fence rail and extending over said table top;
 a sensor strip connected to said fence rail, said rail having a sensor strip configured to provide digital signals that are indicative of specific positions along the length thereof;
 a sensing unit movable along said sensor strip and operatively connected to said fence, said sensing unit generating signals indicative of the specific longitudinal position of said fence;
 a switch operatively connected to a processing unit for establishing a reference position when activated;
 a processing unit connected to said sensing unit for receiving said position indicating signals and for calculating the distance between said fence and said reference position and for generating display signals indicative of said calculated distance;
 a display unit electrically connected to said processing unit configured to receive said display signals and provide a digital display of said calculated distance; and
 a member physically connecting said sensing unit, said display unit and said processing unit together, said fence having a fixed elongated pin extending downwardly and being configured to engage a generally vertically oriented slot in said member when said fence is lowered onto said fence rail, whereby said fence cannot be moved relative to said member in the longitudinal direction of said fence rail, said pin separating from said slot when said fence is lifted from said fence rail.

* * * * *